United States Patent
Liu et al.

(10) Patent No.: US 10,186,042 B2
(45) Date of Patent: Jan. 22, 2019

(54) OBJECT MATCHING METHOD AND CAMERA SYSTEM WITH AN OBJECT MATCHING FUNCTION

(71) Applicant: VIVOTEK INC., New Taipei (TW)

(72) Inventors: Cheng-Chieh Liu, New Taipei (TW); Wei-Ming Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 92 days.

(21) Appl. No.: 15/350,123

(22) Filed: Nov. 14, 2016

(65) Prior Publication Data

US 2017/0148175 A1    May 25, 2017

(30) Foreign Application Priority Data

Nov. 20, 2015 (TW) ............................. 104138494 A

(51) Int. Cl.
*G06T 7/20*        (2017.01)
*G06T 7/00*        (2017.01)
(Continued)

(52) U.S. Cl.
CPC ........ *G06T 7/2093* (2013.01); *G06K 9/00771* (2013.01); *G06T 7/0081* (2013.01); *H04N 5/247* (2013.01)

(58) Field of Classification Search
None
See application file for complete search history.

(56) References Cited

U.S. PATENT DOCUMENTS

| 5,384,811 A | * | 1/1995 | Dickopp | H04B 1/66 |
| | | | | 375/242 |
| 6,102,338 A | * | 8/2000 | Yoshikawa | B64G 1/24 |
| | | | | 244/171 |

(Continued)

FOREIGN PATENT DOCUMENTS

| AU | 2015243016 A1 * | 11/2015 | ....... G08B 13/19608 |
| JP | 2015179426 A | * 10/2015 | |

OTHER PUBLICATIONS

Khan, Sohaib, and Mubarak Shah. "Consistent labeling of tracked objects in multiple cameras with overlapping fields of view." IEEE Transactions on Pattern Analysis and Machine Intelligence 25.10 (2003): 1355-1360.*

(Continued)

*Primary Examiner* — Michelle M Entezari
(74) *Attorney, Agent, or Firm* — Winston Hsu

(57) ABSTRACT

An object matching method is applied to a camera system with an object matching function. The object matching method includes detecting a moving object within overlapped monitoring areas of two image capturing units to generate a first coordinate point and a second coordinate point respectively upon a first coordinate system and a second coordinate system, calculating at least one transforming parameter of the first coordinate system relative to the second coordinate system, acquiring a reliability level according to a comparison result between the transforming parameter and a threshold, determining a final transform parameter by the reliability level, utilizing the final transform parameter to transform the first coordinate point into a third coordinate point upon the second coordinate system, and determining whether the first coordinate point and the second coordinate point indicate the same object by difference between the third coordinate point and the second coordinate point.

18 Claims, 7 Drawing Sheets

(51) Int. Cl.
    *H04N 5/247*     (2006.01)
    *G06K 9/00*     (2006.01)

(56) References Cited

U.S. PATENT DOCUMENTS

| | | | | |
|---|---|---|---|---|
| 6,647,146 | B1* | 11/2003 | Davison | G06T 7/564 |
| | | | | 358/1.9 |
| 9,832,385 | B2* | 11/2017 | Kuwabara | G06T 19/006 |
| 2006/0034500 | A1* | 2/2006 | Quist | G06T 3/0075 |
| | | | | 382/130 |
| 2012/0106791 | A1* | 5/2012 | Lim | G06K 9/00771 |
| | | | | 382/103 |
| 2012/0274776 | A1* | 11/2012 | Gupta | G08B 13/19641 |
| | | | | 348/159 |
| 2013/0128050 | A1* | 5/2013 | Aghdasi | H04N 7/181 |
| | | | | 348/158 |
| 2014/0111645 | A1* | 4/2014 | Shylanski | G01B 11/2755 |
| | | | | 348/148 |
| 2014/0278118 | A1* | 9/2014 | Tegtmeier-Last | G01V 1/364 |
| | | | | 702/17 |
| 2016/0161592 | A1* | 6/2016 | Wirola | G01S 5/0252 |
| | | | | 702/150 |

OTHER PUBLICATIONS

Machine Translation of JP 2015-179426 A (Year: 2015).*

* cited by examiner

OBJECT MATCHING METHOD AND CAMERA SYSTEM WITH AN OBJECT MATCHING FUNCTION

BACKGROUND OF THE INVENTION

1. Field of the Invention

The present invention relates to an object matching method and a camera system with an object matching function, and more particularly, to an object matching method and a camera system with an object matching function capable of matching a moving object located inside an overlapped monitoring region between two image capturing units.

2. Description of the Prior Art

The monitoring camera has widespread applications and can be installed on an entrance of building, such as a factory, a dormitory, a store, a building and a residence house, or on a road where few people tread. The monitoring camera can record and store surrounding image for someday investigation or verification. However, a view range of the monitoring camera is limited, and the plurality of monitoring cameras respectively capturing different monitoring regions is combined and applied for the wider monitoring region, to prevent missing any suspicious event inside the monitoring region.

In addition, the view ranges of the plurality of cameras are overlapped to ensure that there has no blind spot on the monitoring image. However, while the object passes through the overlapped region of visual ranges of the cameras, the object is photographed by the cameras and can be individually showed on monitoring images of the cameras. If the camera cannot match that the patterns about the object respectively showed on the monitoring images can be regarded as the same object, the image processing operation cannot accurately count an amount of the object passing through the monitoring region on the monitoring images, or the image processing operation cannot accurately record a route of the object moving inside the monitoring region because the camera cannot recognize that the objects simultaneously showed on the monitoring images are different or the same. Thus, design of a camera system and a related method capable of effectively matching the object staying inside the overlapped region is an important issue in the monitoring industry.

SUMMARY OF THE INVENTION

The present invention provides an object matching method and a camera system with an object matching function capable of matching a moving object located inside an overlapped monitoring region between two image capturing units for solving above drawbacks.

According to the claimed invention, an object matching method of matching an object staying inside an overlapped monitoring region between adjacent monitoring regions captured by two image capturing units is disclosed. The two image capturing units respectively have a first coordinate system and a second coordinate system. The object matching method includes detecting at least one moving object located inside the overlapped monitoring region to generate a first coordinate point upon the first coordinate system and a second coordinate point upon the second coordinate system, calculating at least one transforming parameter of the first coordinate system relative to the second coordinate system, acquiring a reliability level according to a comparison result between the at least one transforming parameter and a threshold, determining a final transform parameter by the reliability level, utilizing the final transform parameter to transform the first coordinate point into a third coordinate point upon the second coordinate system, and determining whether the first coordinate point and the second coordinate point are considered as the same moving object while a difference between the third coordinate point and the second coordinate point is smaller than a specific value.

According to the claimed invention, a camera system with an object matching function has an operation processing unit and two image capturing units electrically connected with each other. An overlapped monitoring region is set between two adjacent monitoring regions captured by the two image capturing units, the two image capturing units respectively have a first coordinate system and a second coordinate system. The operation processing unit is adapted to detect at least one moving object located inside the overlapped monitoring region to generate a first coordinate point upon the first coordinate system and a second coordinate point upon the second coordinate system, so as to calculate at least one transforming parameter of the first coordinate system relative to the second coordinate system, to acquire a reliability level according to a comparison result between the at least one transforming parameter and a threshold, to determine a final transform parameter by the reliability level, to utilize the final transform parameter to transform the first coordinate point into a third coordinate point upon the second coordinate system, and to determine whether the first coordinate point and the second coordinate point are considered as the same moving object while a difference between the third coordinate point and the second coordinate point is smaller than a specific value, for matching the same moving object staying inside the overlapped monitoring region.

The object matching method and the camera system with the object matching function of the present invention dispose the two image capturing units adjacent to each other by letting the monitoring regions overlapped, the coordinate values of the moving object (which can be represented as a reference point) inside the overlapped monitoring region are utilized to calculate and generalize the final transforming parameter mostly suitable for two monitoring images with different coordinate systems, and the coordinate points upon different coordinate systems are transformed onto the same coordinate system via the final transforming parameter, so as to determine whether the coordinate points belong to the same moving object or respectively indicate different moving objects. The present invention can be used to accurately match the moving object located inside the overlapped monitoring region between the image capturing units, to prevent the moving object from being repeatedly counted or prevent the moving route of the same object from being repeatedly drawn.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
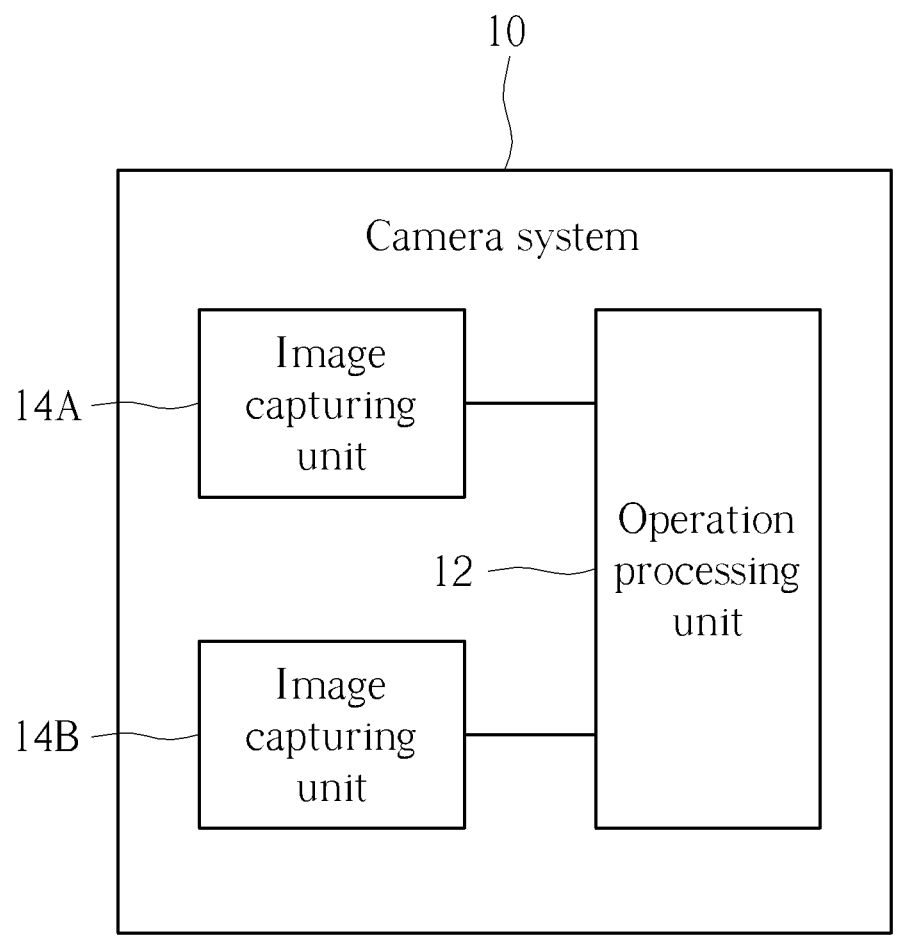
FIG. 1 is a functional block diagram of a camera system according to an embodiment of the present invention.
Figure 2:
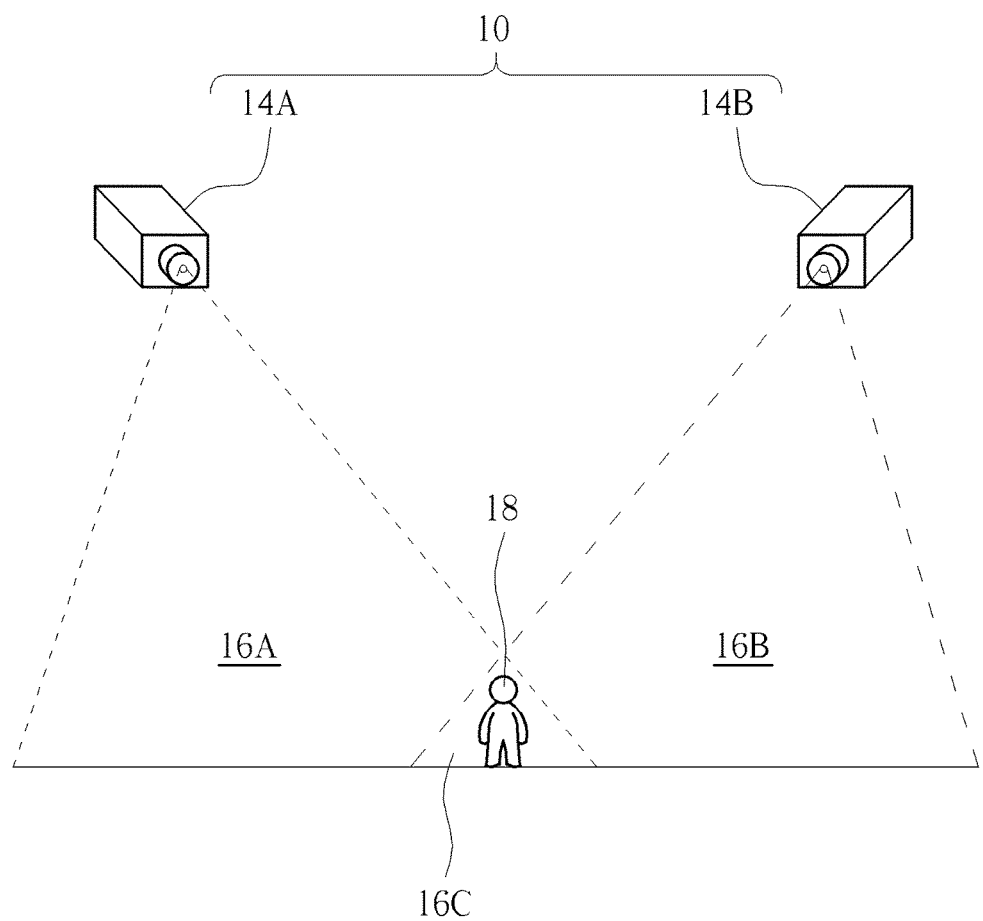
FIG. 2 is an assembly diagram of the camera system according to the embodiment of the present invention.
Figure 3:
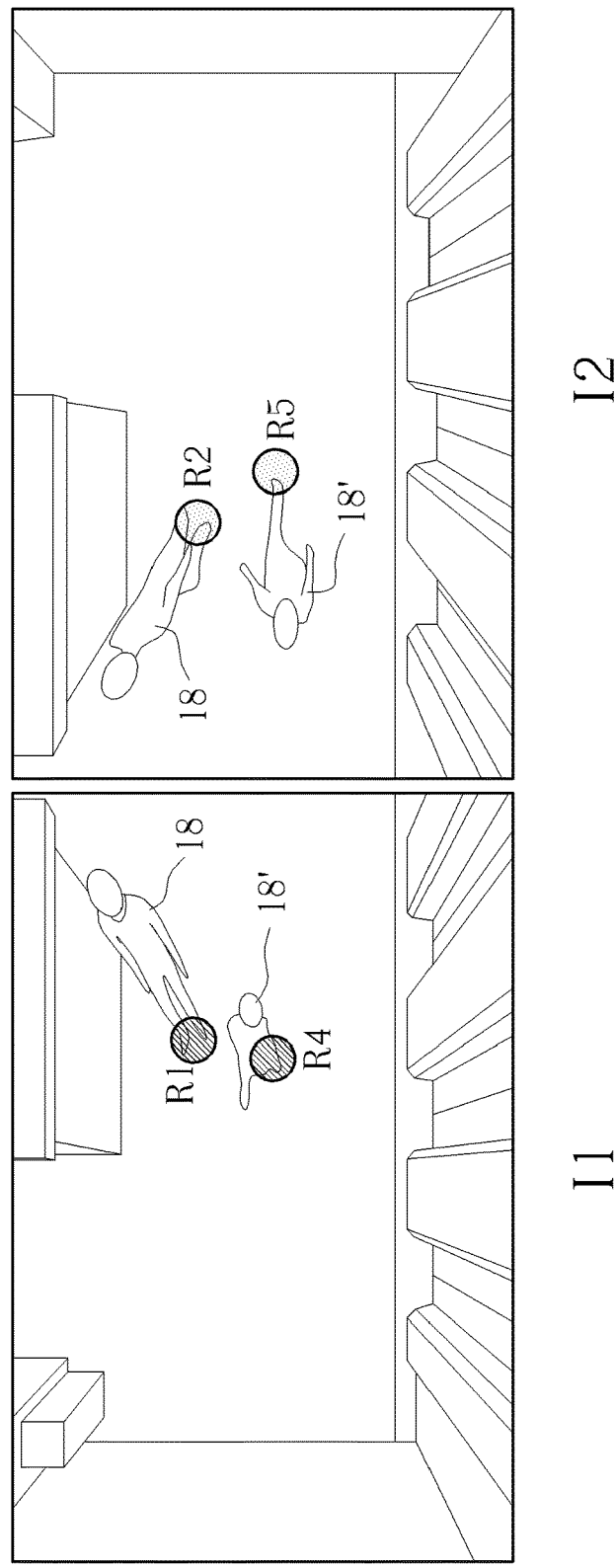
FIG. 3 is a diagram of two monitoring images captured by the camera system from different view angles according to the embodiment of the present invention.

Please refer to FIG. 1 to FIG. 3. FIG. 1 is a functional block diagram of a camera system 10 according to an embodiment of the present invention. FIG. 2 is an assembly diagram of the camera system 10 according to the embodiment of the present invention. FIG. 3 is a diagram of two monitoring images captured by the camera system 10 from different view angles according to the embodiment of the present invention. The camera system 10 includes an operation processing unit 12 and several image capturing units 14A and 14B electrically connected with each other. The camera system 10 in this embodiment has two image capturing units 14A, 14B, and an actual application may have more image capturing units in accordance with design demand. As shown in FIG. 2, while the monitoring environment is greater than the monitoring range of the image capturing unit 14A or 14B, the image capturing unit 14A and the image capturing unit 14B are respectively disposed on opposite sides of the monitoring environment, a monitoring region 16A of the image capturing unit 14A is adjacent to and partially overlapped with a monitoring region 16B of the image capturing unit 14B, so that a combination of the monitoring region 16A and the monitoring region 16B is able to cover the whole range of the monitoring environment. An overlapped monitoring region 16C is formed accordingly, while the moving object 18 passes through or is located inside the overlapped monitoring region 16C, the moving object 18 (or its related coordinate point on the image) can be simultaneously showed on a first monitoring image I1 captured by the image capturing unit 14A and on a second monitoring image I2 captured by the image capturing unit 14B. Therefore, the object matching method of the present invention is applied to recognize which coordinate points on the foresaid monitoring images can be considered as the same moving object 18 for following image processing procedure (such as counting the object, drawing a route of the object and so on).

Figure 4:
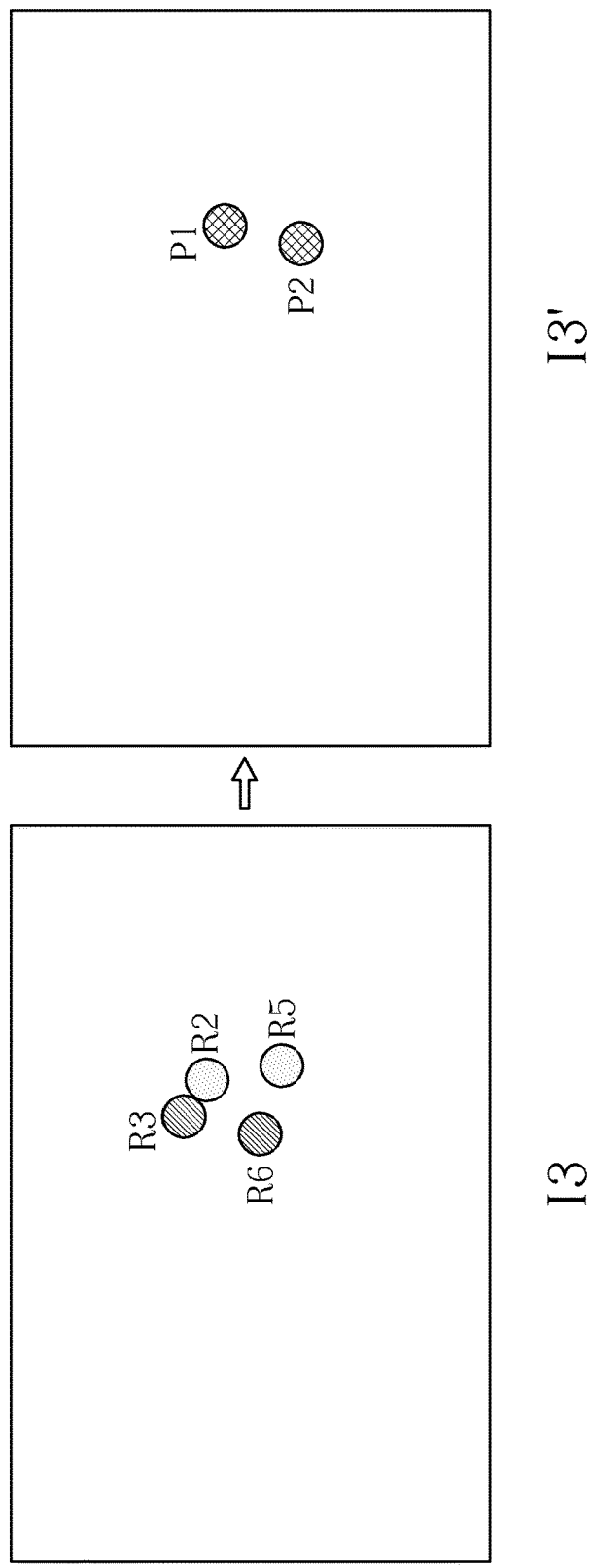
FIG. 4 is a diagram of the camera system transforming positions of the moving object on different monitoring images onto the same reference image according to the embodiment of the present invention.
Figure 5:
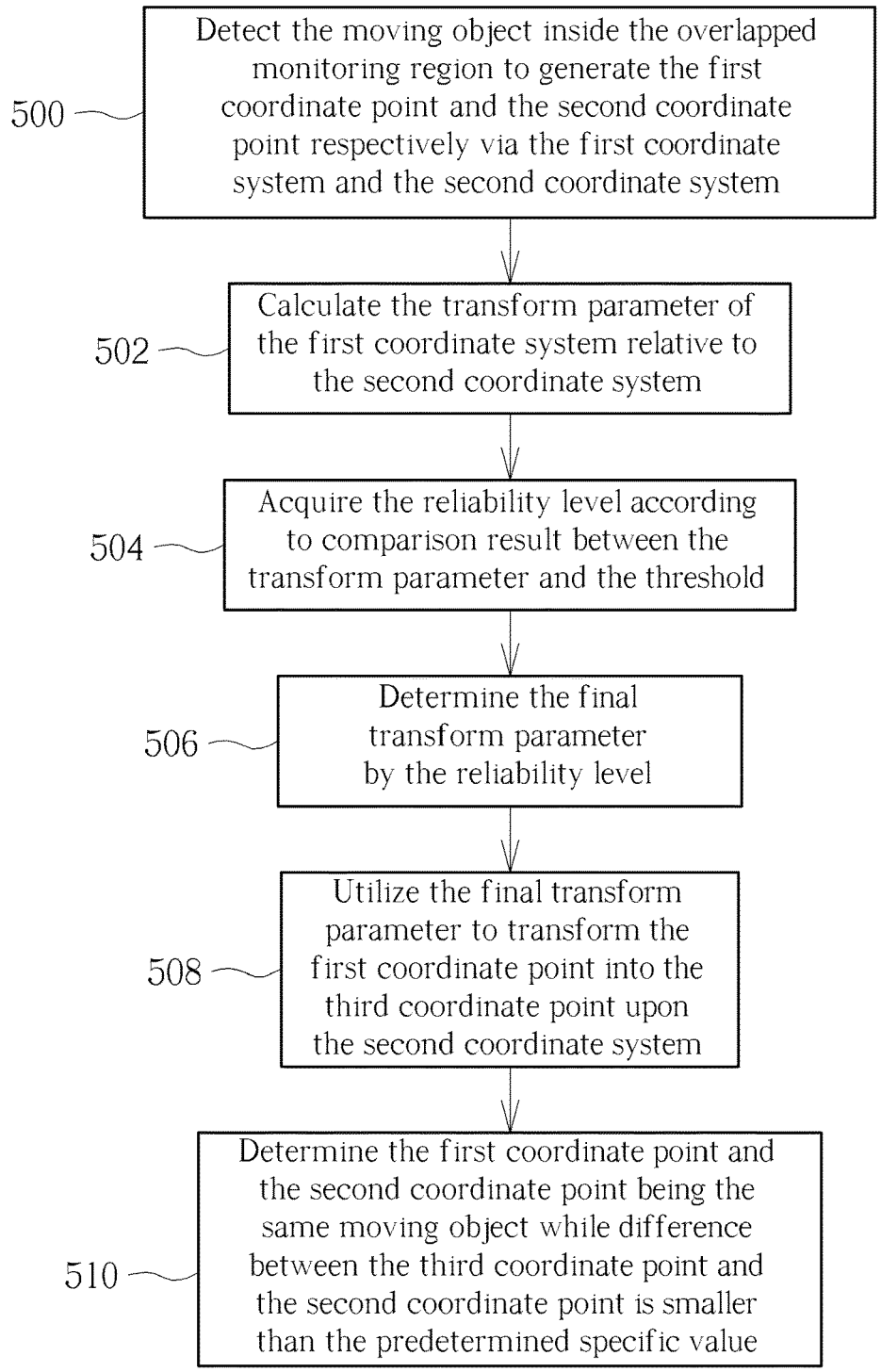
FIG. 5 is a flowchart of the object matching method according to the embodiment of the present invention.

Please refer to FIG. 2 to FIG. 5. FIG. 4 is a diagram of the camera system 10 transforming positions of the moving object 18 on different monitoring images onto the same reference image I3 and I3' according to the embodiment of the present invention. FIG. 5 is a flow chart of the object matching method according to the embodiment of the present invention. The image capturing unit 14A and the image capturing unit 14B are driven to simultaneously capture the first monitoring image I1 and the second monitoring image I2, and behavior information of the moving object 18 (such like an arrest point, a moving distance and a moving direction of the object) within the overlapped monitoring region 16C can be acquired from the first monitoring image I1 and the second monitoring image I2. The image capturing unit 14A and the image capturing unit 14B are located on different positions, and a first coordinate system of the first monitoring image I1 is dissimilar from a second coordinate system of the second monitoring image I2. An amount of the moving object 18 is not limited to the embodiment shown in FIG. 2, which depends on actual demand.

According to the object matching method, step 500 is executed to detect the moving object 18 staying inside or passing through the partial overlapped region (which means the overlapped monitoring region 16C) between the adjacent monitoring regions 16A and 16B, and a first coordinate point R1 is generated via the first coordinate system and a second coordinate point R2 is generated via the second coordinate system. It is to say, the image capturing unit 14A and the image capturing unit 14B firstably capture the first monitoring image I1 and the second monitoring image I2, the operation processing unit 12 searches the moving object from the monitoring images I1, I2 to be the coordinate point, and position and/or the moving route of the moving object 18 can be confirmed accordingly. Then, step 502 is execute that the operation processing unit 12 calculates a transform parameter of the first coordinate system of the first monitoring image I1 relative to the second coordinate system of the second monitoring image I2. For instance, the transform parameter may probably be an offset, a scaling ratio and/or a rotary view angle of any feature of the first coordinate system relative to any corresponding feature of the second coordinate system. Step 504 and step 506 are executed to acquire a value of the reliability level in accordance with a comparison result between the transform parameter calculated in step 502 and a threshold, and to determine a final transform parameter by the reliability level. Eventually, step 508 and step 510 are executed that the operation processing unit 12 utilizes the final transform parameter ultimately decided to transform the first coordinate point R1 upon the first coordinate system into a third coordinate point R3 upon the second coordinate system (which means the first coordinate point R1 is projected onto a corresponding position upon the second coordinate system via coordinate transformation). While a difference between the third coordinate point R3 and the second coordinate point R2 is smaller than a predetermined specific value, the first coordinate point R1 and the second coordinate point R2 can be considered as the same moving object 18. In one embodiment, the difference can be an interval between the third coordinate point R3 and the second coordinate point R2, and the predetermined specific value is an allowed interval range. Variation of the said difference and the said predetermined specific value are not limited to the above-mentioned embodiment.

It should be mentioned that the first coordinate point R1 of the moving object 18 within the first monitoring image I1 is generated via the first coordinate system, the second coordinate point R2 of the moving object 18 within the second monitoring image I2 is generated via the second coordinate system. The first monitoring image I1 and the second monitoring image I2 are captured from different view angles, so the transform parameter is consequentially used to find out coordinate transformable relation between pixels respectively on the first coordinate system and the second coordinate system. The transform parameter is preferably calculated via a generalization manner. Coordinate values of the third coordinate point R3 upon the second coordinate system transformed from the first coordinate point R1 may not identical with coordinate values of the second coordinate point R2, however the third coordinate point R3 and the second coordinate point R2 can be considered as the same moving object 18 while the difference between the two coordinate points R2, R3 is smaller than the specific value. On the contrary, the third coordinate point R3 and the second coordinate point R2 respectively belong to two adjacent moving objects while the difference between the two coordinate points R2, R3 is greater than or equal to the specific value. The object matching method can effectively determine whether the plurality of moving object 18 respectively showed on the monitoring image I1, I2 are the same object.

For decreasing a load of the operation processing unit 12, the reference image I3 may not show background frames captured by the image capturing units 14A and 14B, patterns about the second coordinate point R2 and the third coordinate point R3 are preferably marked on a sketch image displayed by the screen, and the user can visually observe an amount and position of the object. Actual application is not limited to the above-mentioned embodiment. The present invention further can stitch the first monitoring image I1 with the second monitoring image I2 to form the stitching image showing the realistic background, and the patterns about the second coordinate point R2 and the third coordinate point R3 are marked on the stitching image for visual observation.

As shown in FIG. 3 and FIG. 4, while the plurality of moving objects 18, 18' passes through the overlapped monitoring region 16C between the image capturing unit 14A and the image capturing unit 14B, a plurality of first coordinate points R1, R4 and a plurality of second coordinate points R2, R5 are generated upon the first coordinate system (or the related first monitoring image I1) and the second coordinate system (or the related second monitoring image I2). The object matching method makes several pairs of any first coordinate point upon the first coordinate system (or the third coordinate point upon the second coordinate system accordingly transformed from the first coordinate point) and any corresponding second coordinate point upon the second coordinate system. For example, the first coordinate point R1 (or the third coordinate point R3 transformed from the first coordinate point R1) is corresponding to the second coordinate point R2 to make a first pair, the first coordinate point R1 (or the third coordinate point R3) is corresponding to the second coordinate point R5 to make a second pair, the first coordinate point R4 (or the third coordinate point R6 transformed from the first coordinate point R4) is corresponding to the second coordinate point R2 to make a third pair, and the first coordinate point R4 (or the third coordinate point R6) is corresponding to the second coordinate point R5 to make a fourth pair.

Since step 510 is executed, coordinate difference between the first pair and the fourth pair is smaller than the specific value, coordinate points of the said pairs can be considered as the same moving objects 18, 18'; the coordinate difference between the second pair and the third pair is greater than the specific value, the coordinate points of the said pairs cannot be the same moving objects 18, 18' and be eliminated accordingly. Further, step 510 can be executed to determine whether the coordinate points are considered as the same moving object in accordance with difference the coordinate values. For instance, the coordinate point R1 (or the coordinate point R3) and the coordinate point R2 can be corresponding to the coordinate point R4 (or the coordinate point R6) and the coordinate point R5 to make the first pair, the coordinate point R1 (or the coordinate point R3) and the coordinate point R5 can be corresponding to the coordinate point R4 (or the coordinate point R6) and the coordinate point R2 to make the second pair, a difference combination of the first pair is smaller than the specific value, so that the first coordinate point R1 and the second coordinate point R2 can be considered as the same moving object 18, and the first coordinate point R4 and the second coordinate point R5 can be considered as the same moving object 18'.

While the coordinate points of the same moving object 18 are confirmed, the object matching method provides a new reference number for the moving object, and routes of the coordinate points of the same moving object 18 are combined to generate a moving route of the moving object marked by the new reference number. For example, the third coordinate point R3 and the second coordinate point R2 upon the reference image I3 can be defined as a positioning point P1 upon the reference image I3', the third coordinate point R6 and the second coordinate point R5 upon the reference image I3 can be defined as a positioning point P2 upon the reference image I3'. In the embodiment of the present invention, there are two moving objects 18, 18' located within the monitoring regions 16A, 16B, and four coordinate points R1, R2, R3 and R4 are generated respectively upon the first monitoring image I1 and the second monitoring image I2 because the moving objects 18, 18' are located inside the overlapped monitoring region 16C, so that the object matching method of the present invention can eliminate the echoed coordinate points and provide the new reference numbers P1, P2 for the moving object 18, 18', so as to match the object effectively and accurately for preventing the object from being repeatedly counted.

Figure 6:
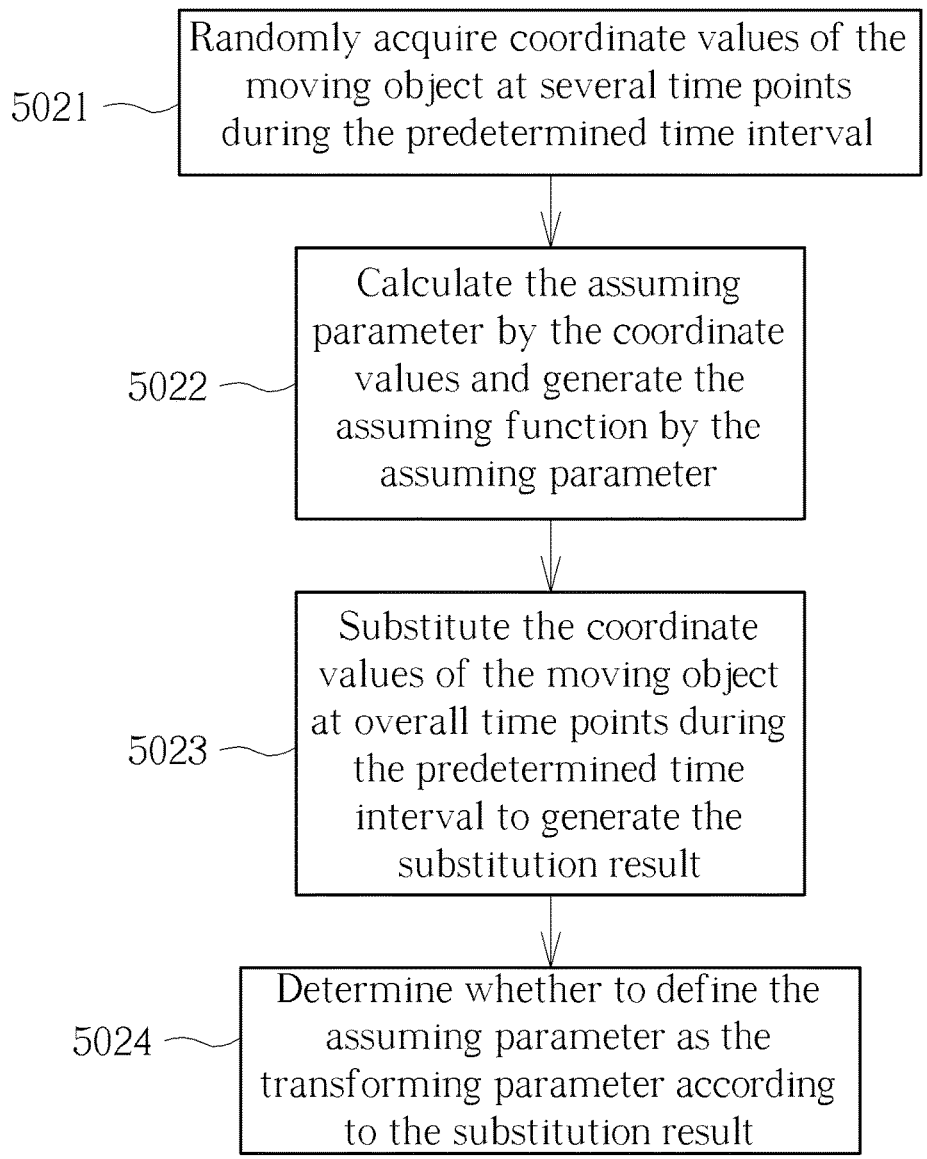
FIG. 6 is a flow chart of acquiring the transform parameter via the object matching method according to the embodiment of the present invention.

Please refer to FIG. 6. FIG. 6 is a flow chart of acquiring the transform parameter via the object matching method according to the embodiment of the present invention. In movement of the moving object 18, the operation processing unit 12 randomly acquires coordinate values, such as first coordinate values (x1, y1) and second coordinate values (x2, y2), of the moving object 18 within the first coordinate system and the second coordinate system at one or more time points during at least one predetermined time interval (step 5021), the said coordinate values are used to calculate an assuming parameter and the assuming parameter is used to generate the corresponding assuming function (step 5022). The assuming parameter can be a linear ratio of the first coordinate values to the second coordinate values, and the assuming function is generated according to the linear ratio. In the meanwhile, the assuming function cannot be utilized to accurately execute the coordinate value transformation between the first coordinate system and the second coordinate system. Therefore, the operation processing unit 12 substitutes the coordinate values of the moving object 18 at overall time points during the said predetermined time interval for the assuming function to generate a plurality of substitution results (step 5023). A period of the moving object 18 staying inside the overlapped monitoring region 16C can be divided into a plurality of predetermined time intervals. The assuming function which has a maximal amount of the substitution result conforming to the said assuming function can be interpreted as the proper assuming function. Final, the assuming parameter corresponding to the substitution result can be determined whether to regard as the transforming parameter in accordance with the said substitution result (step 5024). It is to say, while step 5024 is executed, the image stitching method looks for the assuming parameter having the maximal amount of the substitution result within the allowed range, the foresaid assuming parameter has greater correct probability and can be regarded as the transforming parameter. In one embodiment, while a plurality of moving objects 18 is located inside the overlapped monitoring region 16C, the transforming parameter can be determined as in use by generating at least one substitution result of each moving object 18. While the overlapped monitoring region 16C has the single one moving object 18, the period of the moving object 18 staying inside the overlapped monitoring region 16C can be divided into the plurality of predetermined time intervals, and each predetermined time interval can generate at least one substitution result to determine the adopted transforming parameter. Moreover, transformation between the first coordinate system and the second coordinate system can be processed by conventional linear conversion formula, and a detailed description is omitted herein for simplicity.

Figure 7:
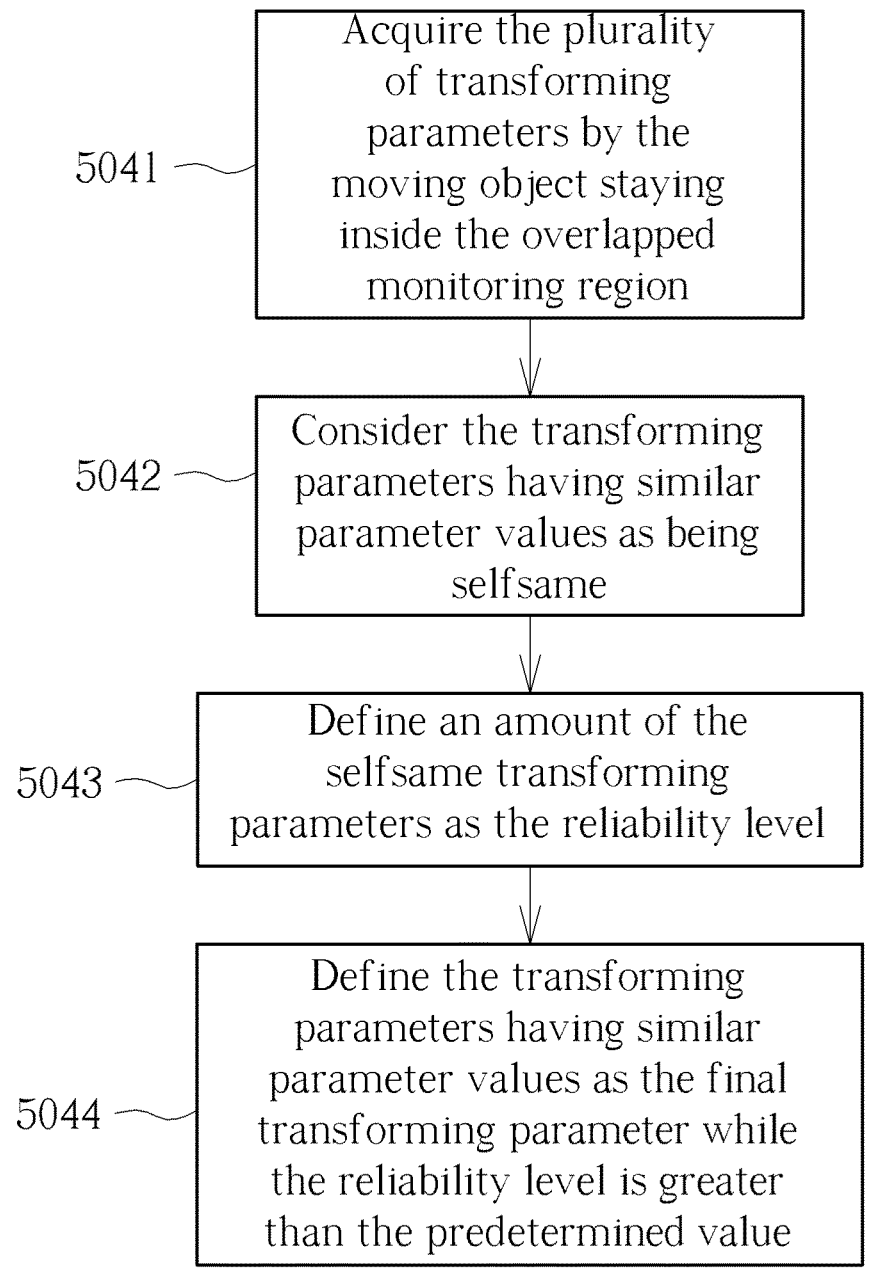
FIG. 7 is a flow chart of acquiring the reliability level by the object matching method according to the embodiment of the present invention.

Please refer to FIG. 1 and FIG. 7. FIG. 7 is a flow chart of acquiring the reliability level by the object matching method according to the embodiment of the present invention. The operation processing unit 12 executes step 5041 to acquire the plurality of transforming parameters by the moving object 18 staying inside the overlapped monitoring region 16C contained within the monitoring regions 16A and 16B overlapped with each other. Values of the transforming parameter can be more accurate in accordance with large numbers of the moving object 18 and the transforming parameter. Because the transforming parameters may not be completely identical with each other, step 5042 is executed that the operation processing unit 12 considers the transforming parameters having similar parameter values as being selfsame since a difference between the foresaid transforming parameters is lower than the threshold. Then, step 5043 is executed to define an amount of the selfsame transforming parameters interpreted in step 5042 as a value of the reliability level via the operation processing unit 12. For example, the amount of the selfsame transforming parameters interpreted in step 5042 can be directly used as the reliability level, or the amount of the selfsame transforming parameters interpreted in step 5042 is transformed into the reliability level by specific manners, which depends on design demand. Eventually, step 5044 is executed that the transforming parameters having the similar parameter values are used to define the final transforming parameter while the reliability level is greater than the predetermined value; for instance, the predetermined value is set as ten, there are ten transforming parameters that have similar parameter values, and difference between the said similar parameter values smaller than the threshold can be searched by step 5042, one of the ten transforming parameters can be defined as the final transforming parameter, or an average of some of the ten transforming parameters can be defined as the final transforming parameter, or an average of the all transforming parameters can be defined as the final transforming parameter. Variation of calculating the final transforming parameter is not limited to the above-mentioned embodiments.

In conclusion, the object matching method and the camera system with the object matching function of the present invention dispose the two image capturing units adjacent to each other by letting the monitoring regions overlapped, the coordinate values of the moving object (which can be represented as a reference point) inside the overlapped monitoring region are utilized to calculate and generalize the final transforming parameter mostly suitable for two monitoring images with different coordinate systems, and the coordinate points upon different coordinate systems are transformed onto the same coordinate system via the final transforming parameter, so as to determine whether the coordinate points belong to the same moving object or respectively indicate different moving objects. The present invention can be used to accurately match the moving object located inside the overlapped monitoring region between the image capturing units, to prevent the moving object from being repeatedly counted or prevent the moving route of the same object from being repeatedly drawn.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object matching method of matching an object staying inside an overlapped monitoring region between adjacent monitoring regions captured by two image capturing units, the two image capturing units respectively having a first coordinate system and a second coordinate system, the object matching method being applied to a camera system having an operation processor electrically connected with the two image capturing units, the object matching method comprising:

the operation processor detecting at least one moving object located inside the overlapped monitoring region to generate a first coordinate point upon the first coordinate system and a second coordinate point upon the second coordinate system;

the operation processor computing a plurality of transforming parameters of the first coordinate system relative to the second coordinate system;

the operation processor setting some of the plurality of transforming parameters having similar parameter values as being selfsame according to a comparison result between the transforming parameters and a threshold;

the operation processor defining an amount of the said selfsame transforming parameters as a reliability level;

the operation processor determining a final transform parameter by the reliability level;

the operation processor utilizing the final transform parameter to transform the first coordinate point into a third coordinate point upon the second coordinate system; and the operation processor determining whether the first coordinate point and the second coordinate point are considered as the same moving object when a difference between the third coordinate point and the second coordinate point is smaller than a specific value.

2. The object matching method of claim 1, wherein while a plurality of moving objects is located inside the overlapped monitoring region, any first coordinate point upon the first coordinate system is corresponding to any related second coordinate point upon the second coordinate system to make a pair, and a difference between coordinate points of each pair or a combination of the said difference is utilized to determine whether the two coordinate points respectively upon different coordinate systems are considered as the same moving object.

3. The object matching method of claim 2, wherein while the two coordinate points respectively upon different coordinate systems are considered as the same moving object, the moving object is marked by a new reference number.

4. The object matching method of claim 3, wherein routes of the two coordinate points respectively upon different coordinate systems about the same moving object are combined to generate a moving route of the moving object marked by the new reference number.

5. The object matching method of claim 1, wherein the image capturing units are driven to simultaneously capture monitoring images of the moving object within the overlapped monitoring region.

6. The object matching method of claim 1, wherein a step of computing the plurality of transforming parameters of the first coordinate system relative to the second coordinate system comprises:
the operation processor acquiring coordinate values of the moving object at several time points during at least one predetermined time interval;
the operation processor computing an assuming parameter by the coordinate values;
the operation processor generating an assuming function according to the assuming parameter;
the operation processor substituting the coordinate values of the moving object at the whole time points during the at least one predetermined time interval for the assuming function to generate at least one substitution result; and
the operation processor determining whether the assuming parameter corresponding to the substitution result is regarded as the transforming parameters in accordance with the substitution result.

7. The object matching method of claim 6, wherein a period of the moving object staying inside the overlapped monitoring region is divided into a plurality of predetermined time intervals.

8. The object matching method of claim 6, wherein a step of determining whether the assuming parameter corresponding to the substitution result is regarded as the transforming parameters in accordance with the substitution result is: defining the assuming parameter having a maximal amount of the substitution results within an allowed range as the transforming parameters.

9. The object matching method of claim 1, wherein when the reliability level is greater than a predetermined value, some of the plurality of transforming parameters having the similar parameter values are utilized to define the final transform parameter.

10. The object matching method of claim 1, wherein the transforming parameters is selected from a group consisting of an offset, a scaling ratio, a rotary view angle between the first coordinate system and the second coordinate system, and combination thereof.

11. A camera system with an object matching function, having an operation processor and two image capturing units electrically connected with each other, an overlapped monitoring region being set between two adjacent monitoring regions captured by the two image capturing units, the two image capturing units respectively having a first coordinate system and a second coordinate system, the operation processor being adapted to detect at least one moving object located inside the overlapped monitoring region to generate a first coordinate point upon the first coordinate system and a second coordinate point upon the second coordinate system, to computing a plurality of transforming parameters of the first coordinate system relative to the second coordinate system, to set some of the plurality of transforming parameters having similar parameter values as being selfsame according to a comparison result between the transforming parameters and a threshold, to define an amount of the said selfsame transforming parameters as a reliability level, to determine a final transform parameter by the reliability level, to utilize the final transform parameter to transform the first coordinate point into a third coordinate point upon the second coordinate system, and to determine whether the first coordinate point and the second coordinate point are considered as the same moving object when a difference between the third coordinate point and the second coordinate point is smaller than a specific value, for matching the same moving object staying inside the overlapped monitoring region.

12. The camera system of claim 11, wherein while a plurality of moving objects is located inside the overlapped monitoring region, any first coordinate point upon the first coordinate system is corresponding to any related second coordinate point upon the second coordinate system to make a pair, and a difference between coordinate points of each pair or a combination of the said difference is utilized to determine whether the two coordinate points respectively upon different coordinate systems are considered as the same moving object.

13. The camera system of claim 12, wherein while the two coordinate points respectively upon different coordinate systems are considered as the same moving object, the moving object is marked by a new reference number.

14. The camera system of claim 13, wherein routes of the two coordinate points respectively upon different coordinate systems about the same moving object are combined to generate a moving route of the moving object marked by the new reference number.

15. The camera system of claim 11, wherein the operation processor is further adapted to acquire coordinate values of the moving object at several time points during at least one predetermined time interval, to compute an assuming parameter by the coordinate values, to generate an assuming function according to the assuming parameter, to substitute the coordinate values of the moving object at the whole time points during the at least one predetermined time interval for the assuming function to generate at least one substitution result, and to determine whether the assuming parameter corresponding to the substitution result is regarded as the transforming parameters in accordance with the substitution result while computing the transforming parameters of the first coordinate system relative to the second coordinate system.

16. The camera system of claim 15, wherein the operation processor is further adapted to define the assuming parameter having a maximal amount of the substitution results within an allowed range as the transforming parameters while determining whether the assuming parameter corresponding to the substitution result is regarded as the transforming parameters in accordance with the substitution result.

17. The camera system of claim 11, wherein when the reliability level is greater than a predetermined value, some of the plurality of transforming parameters having the similar parameter values are utilized to define the final transform parameter.

18. The camera system of claim 11, wherein the transforming parameters is selected from a group consisting of an offset, a scaling ratio, a rotary view angle between the first coordinate system and the second coordinate system, and combination thereof.

* * * * *